United States Patent
Riley

[15] 3,678,373
[45] July 18, 1972

[54] RATIO CONTROLLER WITH ZERO RATIO CAPABILITY

[72] Inventor: John Edward Riley, Saugus, Mass.
[73] Assignee: General Electric Company
[22] Filed: Nov. 27, 1970
[21] Appl. No.: 93,156

[52] U.S. Cl. .......................................323/75 N, 137/88
[51] Int. Cl. .......................................G01r 17/14
[58] Field of Search .................137/87, 88; 235/151.34; 307/118; 323/75 N

[56] References Cited

UNITED STATES PATENTS

| | | |
|---|---|---|
| 2,891,218 | 6/1959 | Werts....................323/75 N |
| 2,813,235 | 11/1957 | Clay......................323/75 N |
| 3,247,703 | 4/1966 | Burk.....................323/75 N |
| 3,378,024 | 4/1968 | Kruik....................323/75 N |

Primary Examiner—A. D. Pellinen
Attorney—William S. Wolfe, Frank L. Neuhauser, Oscar B. Waddell and Joseph B. Forman

[57] ABSTRACT

A ratio controller having circuitry for establishing a zero ratio. A master signal provided by a master controller is applied to the upper end of a bridge circuit consisting of two parallel branches. The first branch includes a series-connected potentiometer winding. The second branch includes two series-connected resistors. The ratio of impedances in the second branch can be made equal to the ratio of impedances in the first branch taken between the nominal zero setting of the potentiometer and the upper and lower ends, respectively, of the bridge circuit. An amplifier has a first input connected to the potentiometer tap and a second input connected to the junction of the resistors in the second branch. The output of this amplifier represents the setpoint at which the local process variable should be maintained.

8 Claims, 2 Drawing Figures

PATENTED JUL 18 1972  3,678,373

INVENTOR:
JOHN E. RILEY,
BY Gerald R. Woods
HIS ATTORNEY.

RATIO CONTROLLER WITH ZERO RATIO CAPABILITY

BACKGROUND OF THE INVENTION

The present invention relates to process controllers and, more particularly, to a ratio controller having the capability of establishing a local setpoint at any desired ratio, including a zero ratio, with respect to a master signal.

A common type of industrial process control system includes process controllers which regulate the flow of a mixture of raw materials while concurrently maintaining the composition of the mixture according to a predetermined formula. The control system includes a master controller which responds to a process variable signal representing the flow rate of the mixture by generating a master signal representing the total flow correction required to maintain the mixture flow rate of a setpoint. Each of a plurality of ratio controllers connected to the master controller modifies the master signal to establish a proportional local setpoint signal. Each ratio controller controls the flow of one of the constituents of the mixture as a function of the local setpoint and a local process variable signal representing the actual flow rate of the constituent. By altering the flow rate of each constituent, the mixture flow rate is maintained at the setpoint.

In prior art ratio controllers, a local setpoint is established through the use of a potentiometer having its winding connected in series with the output of the master controller. With the master signal applied across the potentiometer winding, the local setpoint is established by adjusting the potentiometer tap at any position between the 100 percent setting and the nominal zero setting. In a typical prior art controller, the minimum percentage attainable is not actually zero but is on the order of 5 percent due to winding resistance taken between the nominal zero setting of the potentiometer tap and the adjacent winding terminal.

In some instances, it may be desirable to maintain the ratio of a particular local process variable at a ratio less than that attainable in prior art controllers. Also, the fact that the nominal zero setting of the ratio-controlling potentiometer is not an actual zero is the source of calibration problems. By using different transducers to generate process variable signals, identical process controllers can be used to regulate processes operating in different value ranges. Although internal controller circuitry is independent of the value of a variable being monitored, an indicator associated with the process controller is naturally marked according to the range of values through which the process variable is expected to vary. The manufacturer of process control instruments must mark each indicator to show both the scale value of the process variable for a 1.0 ratio and also the actual value of the process variable when the ratio is nominally zero. To simplify calibration problems, it is desirable that a ratio controller have the capability of generating a local setpoint at any predetermined percentage between an actual zero and 100 percent of a master signal. When the controller has this capability, the manufacturer can mark the maximum scale value only as the nominal zero corresponds to an actual zero which would preferably be pre-printed on the indicator scale.

SUMMARY OF THE INVENTION

The present invention is a circuit which is used in a ratio controller to establish a local setpoint at any value between 0 percent and 100 percent of the master signal. The circuit includes a bridge circuit having a first branch including a series-connected potentiometer winding and a second parallel branch with first and second serially connected resistors. The master signal is applied to the upper end of the bridge circuit. An amplifier has a first input connected to the potentiometer tap and a second relatively inverted input connected to the junction of the first and second resistors. The output of the amplifier is the local setpoint signal. When the ratio of the first and second impedances in the second branch is equal to the ratio of impedances in the first branch taken between the potentiometer tap at its nominal zero setting and the upper and lower ends, respectively, of the first branch, an actual zero ratio exists.

DESCRIPTION OF THE DRAWING

While the specification concludes with claims particularly pointing out and distinctly claiming that which is regarded as the present invention, certain details of a preferred embodiment of the invention may be more readily ascertained from the following detailed description when read in conjunction with the accompanying drawings in which:

DETAILED DESCRIPTION

Figure 1:
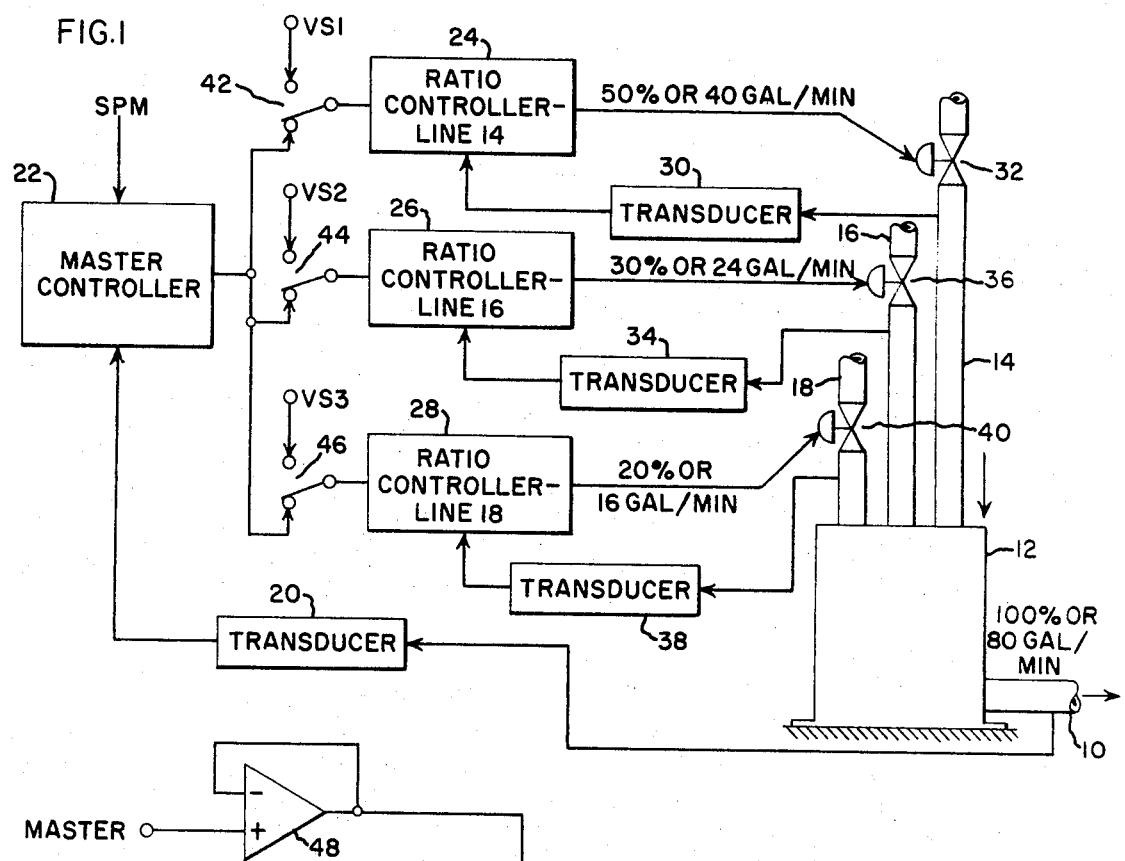
FIG. 1 is a block diagram of a typical process control system using ratio controllers.

Referring now to FIG. 1, the process control system shown in block diagram form controls the flow of a fluid mixture through a pipeline 10 connected to a fluid mixing tank 12 by controlling the flow of constituents entering the mixing tank 12 through pipelines 14, 16 and 18. The flow of the mixture through pipeline 10 is monitored by a suitable flow transducer 20 which generates a process variable signal proportional to the flow rate. The process variable signal is compared to a setpoint signal, SPM, in a master controller 22 wherein a corrective or master signal is generated. The master signal is applied to a plurality of ratio controllers 24, 26, 28, each of which is associated with a different one of the pipelines 14, 16, 18.

Each of the ratio controllers 24, 26, 28 contains means for scaling the master signal provided by master controller 22 to provide a local setpoint at a desired percentage of the master signal. For example, if the constituent flowing through pipeline 14 is to be 50 percent of the total flow through pipeline 10, circuitry in ratio controller 24 establishes a local setpoint equal to 50 percent of the master signal. A flow transducer 30 monitors the fluid flow through pipeline 14 and provides a local process variable signal to the ratio controller 24. The local process variable signal is compared to the local setpoint to obtain necessary corrective signals for adjusting the setting of a valve 32 to correct the fluid flow through pipeline 14 by 50 percent of the total correction required in pipeline 10. The fluid flow through pipeline 16 is similarly regulated in a closed control loop including flow transducer 34, ratio controller 26 and valve 36. The control loop for pipeline 18 consists of flow transducer 38, ratio controller 28 and valve 40.

In one embodiment of the invention, the ratio controllers 24, 26, 28 may be connected either to the master controller 22 or to conventional manually adjusted voltage sources VS1, VS2, VS3 through input switching means 42, 44 and 46. In this embodiment of the invention, each of the ratio controllers may be operated as a conventional process controller independently of the master controller 22.

Figure 2:
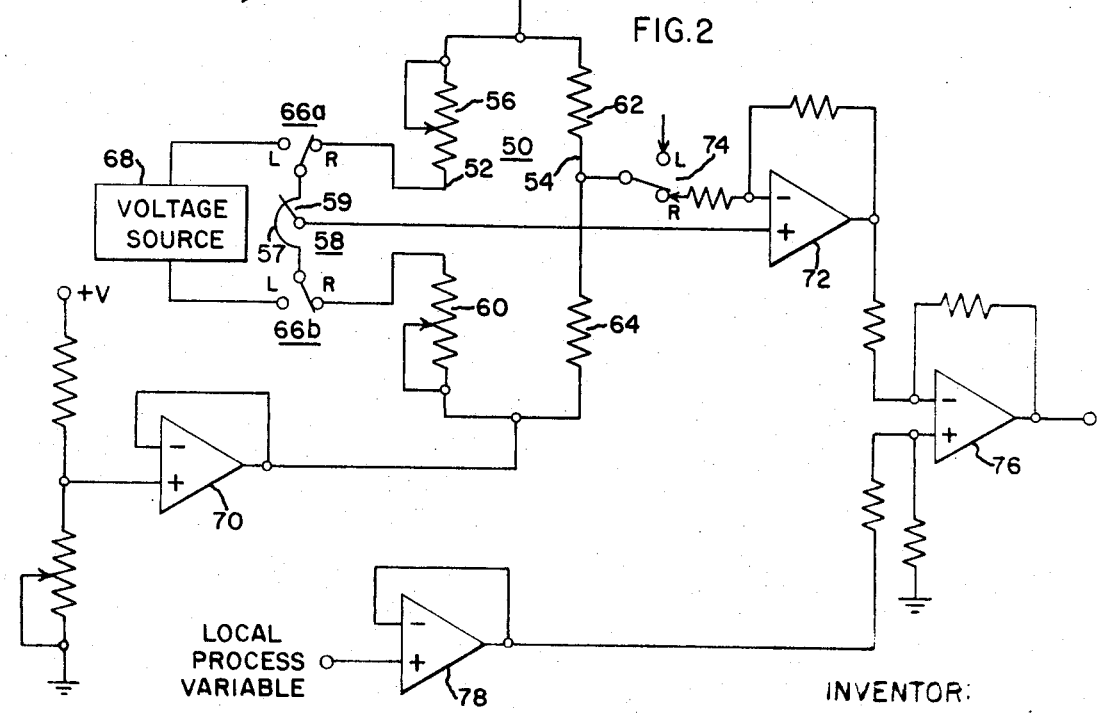
FIG. 2 is a partial schematic diagram of a circuit capable of establishing a zero in a ratio controller.

The circuitry required to scale the master signal to obtain a local setpoint signal is shown in greater detail in FIG. 2. The master signal is applied to the non-inverting input of a high input impedance amplifier 48 having an output terminal connected to the upper end of a bridge circuit 50 with first and second parallel-connected branches 52 and 54. The first branch 52 includes a first adjustable resistor 56, the winding 57 of a potentiometer 58 and a second adjustable resistor 60. The adjustable resistor 56 is used to establish the range through which a ratio may be varied while the potentiometer 58 is used to establish the precise ratio within a pre-selected range. The second branch 54 of bridge circuit 50 includes a first resistor 62 and a second resistor 64.

A switching circuit consisting of an upper contact set 66a and a lower contact set 66b may be included in branch 52 to permit the potentiometer 58 to be energized either by the master controller output or by a manually adjustable voltage source 68. The source 68 provides a constant setpoint signal independent of the process conditions.

In one embodiment of the invention, the output of amplifier 48 varies through a 1 to 5 voltage range. The 1 volt is eliminated from the signal imposed across the bridge circuit 50 by means of another high input impedance follower amplifier 70 having a fixed bias voltage applied to its non-inverting input terminal. By adjusting the input voltage to the amplifier 70, the output is adjusted to 1.0 volt so that the voltage across the bridge circuit varies between 0 and 4.0 volts.

The tap 59 of potentiometer 58 is connected to the non-inverting input terminal of an amplifier 72 while the junction of the resistors 62 and 64 in the second branch 54 is connected to the inverting input terminal of amplifier 72 through a switch 74. When the ratio controller is to be used as a conventional controller with a manually adjusted setpoint, switch 74 disconnects the inverting input of amplifier 72 from the second branch of the bridge circuit 50. Under these conditions, the voltage applied to the non-inverting input terminal of the amplifier 72 is determined entirely by the voltage applied across potentiometer 58 by voltage source 68.

Under normal conditions, however, the voltage source 68 is open circuited and the switch 74 connects the junction of the resistor 62 and 64 to the inverting input terminal of amplifier 72. The output of the amplifier 72 represents a local setpoint that is applied to the inverting input terminal of a differential amplifier 76 where it is compared to a local process variable signal applied to the non-inverting input terminal of the amplifier 76. In a preferred embodiment of the invention, the local process variable signal is generated by a local transducer (not shown) and is applied to a high input impedance follower amplifier 78 before being applied to the non-inverting input terminal of the differential amplifier 76. It should be understood that the local setpoint signal and the local process variable signal could be applied to opposite input terminals of differential amplifier 76 if required in the control of a particular process.

In the circuit described above, an absolute zero ratio may be achieved as follows. Once the potentiometer tap 59 is located in its nominal zero setting, the resistor 60 is adjusted until the ratio of resistance in the first and second branches is equal. More particularly, the ratio of resistor 62 to resistor 64 is made equal to the ratio of the resistance in the first branch taken between the upper end of the bridge circuit and tap 59 and between the tap 59 and the lower end of the bridge circuit. When these impedance ratios are equalized, the bridge is balanced and the same voltage is applicable to both amplifier inputs. Changes in the signal applied to bridge circuit 50 will result in equal voltage changes at both inputs to amplifier 72.

While there has been described what is presently thought to be a preferred embodiment of a ratio controller having zero ratio capability, it should be understood that variations and modifications therein will occur to those skilled in the art once they become familiar with the invention. Therefore, it is intended that the appended claims shall be construed to include all such variations and modifications as fall within the true spirit and scope of the invention.

I claim:

1. In a process control system having a master controller and at least one local controller, each of which is to maintain a local process variable at a local setpoint, a circuit for establishing a local setpoint as a predetermined percentage, between 0 and 100, of a master signal comprising:
   a. a bridge circuit having a first leg with a potentiometer and a second parallel leg with first and second serially connected resistors;
   b. means for applying the master signal to one junction of said first and second legs;
   c. an amplifier having a first input connected to the tap on said potentiometer and a second complementary input connected to the junction of said first and second resistors, the output of said amplifier being the local setpoint; and
   d. means for adjusting impedances in said bridge circuit to establish the same ratio of impedances in each leg taken between said one junction of said first and second legs and each amplifier input and between each amplifier input and the other junction of said first and second legs when the potentiometer tap is at its nominal zero setting.

2. A circuit as recited in claim 1 wherein said adjusting means comprises an adjustable third resistor connected in the first leg between the potentiometer and said other junction of said first and second legs.

3. A circuit as recited in claim 2 further including a span-controlling adjustable fourth resistor connected in said first leg between the potentiometer and said one junction of said first and second legs.

4. A circuit as recited in claim 3 in further combination with:
   a. means for generating a local process variable signal;
   b. a differential amplifier having a first input terminal connected to the output of said first-mentioned amplifier, a second input terminal connected to the output of said local process variable signal generating means, and an output terminal; and
   c. a control element connected to the output terminal of said differential amplifier for altering the process to drive the local process variable toward the established local setpoint.

5. A circuit as recited in claim 2 in further combination with:
   a. means for generating a local process variable signal;
   b. a differential amplifier having a first input terminal connected to the output of said first-mentioned amplifier, a second input terminal connected to the output of said local process variable signal generating means, and an output terminal; and
   c. a control element connected to the output terminal of said differential amplifier for altering the process to drive the local process variable toward the established local setpoint.

6. A circuit as recited in claim 1 further including a span-controlling adjustable fourth resistor connected in said first leg between the potentiometer and said one junction of said first and second legs.

7. A circuit as recited in claim 6 in further combination with:
   a. means for generating a local process variable signal;
   b. a differential amplifier having a first input terminal connected to the output of said first-mentioned amplifier, a second input terminal connected to the output of said local process variable signal generating means, and an output terminal; and
   c. a control element connected to the output terminal of said differential amplifier for altering the process to drive the local process variable toward the established local setpoint.

8. A circuit as recited in claim 1 in further combination with:
   a. means for generating a local process variable signal;
   b. a differential amplifier having a first input terminal connected to the output of said first-mentioned amplifier, a second input terminal connected to the output of said local process variable signal generating means, and an output terminal; and
   c. a control element connected to the output terminal of said differential amplifier for altering the process to drive the local process variable toward the established local setpoint.

* * * * *